United States Patent [19]

Inoue

[11] Patent Number: 4,508,950
[45] Date of Patent: Apr. 2, 1985

[54] EDM METHOD AND APPARATUS USING LIQUID HYDROCARBON DECOMPOSITION YIELDED GASES AND A DEIONIZED WATER LIQUID

[75] Inventor: Kiyoshi Inoue, Tokyo, Japan

[73] Assignee: Inoue-Japax Research Incorporated, Yokohama, Japan

[21] Appl. No.: 474,745

[22] Filed: Mar. 10, 1983

[30] Foreign Application Priority Data

Mar. 25, 1982 [JP] Japan .................................. 57-48441

[51] Int. Cl.³ .............................................. B23P 1/08
[52] U.S. Cl. .............................. 219/69 D; 219/69 M; 219/69 W
[58] Field of Search ................. 219/69 D, 69 M, 69 E, 219/69 W, 69 R, 68; 204/129.75, 129.8, 129.85

[56] References Cited

U.S. PATENT DOCUMENTS

| | | | |
|---|---|---|---|
| 2,427,588 | 9/1947 | Burnett | 219/69 E |
| 2,526,423 | 10/1950 | Rudorff | 219/69 D |
| 2,978,569 | 4/1961 | Boretti et al. | 219/69 M |
| 2,996,602 | 8/1961 | Webb | 219/69 D |
| 3,472,993 | 10/1969 | Gromov et al. | 219/69 D |
| 3,939,321 | 2/1976 | Bertrand et al. | 219/69 D |
| 4,263,493 | 4/1981 | Kilcher | 219/69 W |
| 4,317,019 | 2/1982 | Itoh | 219/69 M |
| 4,375,588 | 3/1983 | Frei | 219/69 D |

FOREIGN PATENT DOCUMENTS

| | | | |
|---|---|---|---|
| 43-19656 | 8/1968 | Japan | 219/69 D |
| 621525 | 8/1978 | U.S.S.R. | 219/69 D |

Primary Examiner—Roy N. Envall, Jr.
Assistant Examiner—Geoffrey S. Evans
Attorney, Agent, or Firm—Karl F. Ross; Herbert Dubno

[57] ABSTRACT

An improved EDM method and apparatus in which a hydrocarbon liquid such as kerosene is decomposed, outside of an EDM gap, to produce therefrom gases containing gaseous hydrocarbons, which gases are injected into the machining gap immersed in a deionized water liquid coolant. The liquid hydrocarbon is so decomposed, e.g. thermally, as to yield these gases which contain 30 to 85% hydrogen and the balance essentially the gaseous hydrocarbons. The thermal decomposition uses heating the liquid hydrocarbon at a temperature not in excess of 300° C. The liquid hydrocarbon decomposition gases may be entrained in a stream of a deionized water for delivery into the EDM gap whose region is immersed in a continuous volume of the deionized water. The decomposition of the liquid hydrocarbon may be carried out in a separate thermal decomposition system connected to the machining gap via a continuous conduit communicating a source of the liquid hydrocarbon with the machining gap.

30 Claims, 3 Drawing Figures

EDM METHOD AND APPARATUS USING LIQUID HYDROCARBON DECOMPOSITION YIELDED GASES AND A DEIONIZED WATER LIQUID

FIELD OF THE INVENTION

The present invention relates generally to the electrical-discharge-machining (EDM) of a workpiece by supplying a machining fluid into a machining gap formed between a tool electrode and the workpiece while repetitively and intermittently applying a voltage pulse across the machining gap flooded with the machining fluid. A train of power pulses are thus formed to create localized, discrete and randomly dispersed stock removal discharges which produce cumulatively overlapping craters on the workpiece surface; the total surface juxtaposed with the tool electrode is thus machined uniformly over the parts thereof confronting the tool electrode. As material removal proceeds, the tool electrode and the workpiece are relatively displaced so as to continue development of such material-removal discharges until a desired extent of machining is achieved. During the machining operation, small metallic or conductive chips or particles removed from the workpiece (and also tool electrode) surfaces as well as other discharge products such as tar and gases are carried away by the machining fluid which floods the gap and is generally circulated therethrough while the tool electrode is advanced relative to the workpiece by a servo system designed to maintain a predetermined gap spacing substantially constant or to approach the desired gap spacing as accurately as possible. The servo arrangement may also function to respond to gap short-circuiting and arcing conditions to retract the electrode relative to the workpiece thereby removing such conditions.

The invention relates particularly to an improved method of and apparatus for electrical discharge machining of the type described wherein a novel machining fluid is employed to achieve improved machining efficiency.

BACKGROUND OF THE INVENTION

It can be stated that in an EDM process, electric energy is furnished from the power supply in the form of discrete electrical pulses across the machining gap filled with a liquid dielectric to effect a succession of electrical discharges between the tool electrode and the workpiece to remove stock from the latter. Each individual discharge strikes that area of the workpiece juxtaposed with the tool electrode on one minute localized zone or another, the zone being impulsively melted and/or vaporized and mechanically dislodged from the workpiece area by the impulsive discharge pressure. Successive and repetitive discharges are used to sweep the localized stock dislodgment or removal action over the entire workpiece area and result in the formation of cumulatively overlapped discharge craters thereon. As stock removal proceeds, the tool electrode is advanced relatively towards the workpiece by servo feed means adapted to maintain the machining gap spacing substantially constant and thereby to allow stock removal discharges to be successively created.

Electrical discharge machining (EDM) processes are generally divided into three categories, sinking-type EDM, scanning-type EDM and traveling-wire EDM. In this sinking-type EDM process, the tool electrode is a formed solid electrode designed to from a cavity complementary in shape thereto in a workpiece. In this process, the workpiece is immersed in the machining liquid commonly constituted by a hydrocarbon liquid such as kerosene. A worktank is used to retain the hydrocarbon machining liquid and the workpiece immersed therein and positioned sufficiently below the surface of this liquid in the worktank. The tool electrode is commonly formed with one or more fluid passages therein through which the machining liquid is supplied into the machining gap. Alternatively or in addition, one or more nozzles are disposed in the region of the tool electrode or the workpiece and used to direct the machining liquid into the machining gap. It has been recognized that this process entails a danger of fire because of the inflammability of the hydrocarbon liquid. When electrical discharges effected through the hydrocarbon liquid are exposed to air, fire tends to develop and may result in property damage. Furthermore, the hydrocarbon liquid upon decomposition by electrical discharges produces gases and mists and tends to pollute the environmental atmosphere. While the danger of fire may be alleviated by adding certain chemicals to the hydrocarbon liquid, this adds to cost and may result in a significant reduction in the machining efficiency.

In the scanning-type EDM, the tool electrode is a rod or like electrode having a relatively simple or "generic" machining contour and a two- or three-dimensional relative displacement is effected between the generic electrode and the workpiece to yield a desired shaped configuration in or on the workpiece corresponding to the path of the relative displacement.

In the traveling-wire EDM process, the tool electrode is a thin, continuous wire which is axially transported to continuously traverse the workpiece exposed to air. The machining gap formed between the traveling wire electrode and the workpiece needs to be consecutively flushed with the machining liquid which, however, with the workpiece always exposed to air, can in no way be served by an inflammable hydrocarbon liquid as in the sinking-type EDM process. Thus, in the traveling-wire EDM process, it has been the common practice to employ a water liquid as the machining liquid. It has been found that water is much greater in efficiency than hydrocarbon liquids in cooling of the workpiece and in cooling the discharge spots and the particles removed therefrom.

With the traveling-wire process gaining increasing popularity, attempts have been made to apply a water liquid which found its sole use in that process to the sinking-type and scanning-type processes. It has been found, however, that the water liquid when used in these latter processes has the significant disadvantage that a mirror-finish machined surface as required in a finish or ultra-fine machining range are not obtainable. In addition, it has been found that it is unsuitable for use with "no-wear" or "low-wear" machining modes which require the erosive wear of the tool electrode to be minimized. Moreover, it has been observed that with the tool machining area reduced, say, to less than several hundred square millimeters, the water machining liquid seldom offers the required machining stability and efficiency in the sinking-type and scanning-type processes.

These deficiencies of the water liquid give rise to problems in the traveling-wire process as well. Thus, the cutting tends to be unstable for a thicker workpiece or with a thicker wire electrode. The result is a breakage of the wire electrode.

OBJECTS OF THE INVENTION

The present invention seeks to provide an improved EDM method, applicable practically to all the EDM processes described, which makes it possible to achieve a desired EDM operation without the danger of a fire and yet affording an excellent machining stability, quality and efficiency, and which method circumvents the disadvantages of a hydrocarbon liquid and a water liquid by using the two liquids in a novel manner.

The present invention also seeks to provide an improved EDM apparatus for carrying out the method described.

SUMMARY OF THE INVENTION

The present invention is based upon the discovery that these difficulties encountered in the prior art are overcome by a new manner of use conventional liquid hydrocarbon and water in EDM processes. Through such a manner of use it has been discovered that it is possible to circumvent their individual inherent disadvantages and it is possible to realize their peculiar advantages in combination so as to yield new and improved machining results which could never have been expected from their individual uses in the conventional EDM art.

Thus, in accordance with the present invention there is provided, in a first aspect thereof a method of machining an electrically conductive workpiece by means of a succession of discrete, time-spaced electrical discharges effected between a tool electrode and the workpiece across a machining gap so as to electroerosively remove material from the workpiece, which method comprises the steps of: (a) preparing a deionized water liquid of a temperature sufficient to cool at least a region of said tool electrode and said workpiece which defines the machining gap, against heat to be developed by the gap electrical discharges; (b) immersing the said region of the machining gap in a continuous volume of said water liquid; (c) outside of the said machining gap, decomposing a liquid hydrocarbon to yield gases containing gaseous hydrocarbons; and (d) injecting a volume of the yielded gases into the machining gap immersed in the water liquid whereby at least a portion of the injected volume of the gases constitutes a gap fluid medium for the electrical discharges to produce the erosive material removal while the said region tends to be cooled by the deionized water liquid.

Specifically, the method further involves the step of reducing the erosive wear of the tool electrode in step (d) by decomposing at least a portion of the said gaseous hydrocarbons by the electrical discharges to pyrolytically form a carbonaceous layer on the tool electrode against the erosive wear.

The liquid hydrocarbon for pre-decomposition to yield the gases may be kerosene, transformer coil or any other form of liquid hydrocarbon in the conventional EDM use. The liquid hydrocarbon is decomposed so as to yield 30 to 60 or 85% by volume hydrogen and the balance essentially the gaseous hydrocarbons. Optionally, the gases contain 0.1 to 5% by volume oxygen and/or 1 to 5% by volume carbon.

The method may further comprises in step (d) introducing a portion of the volume of the deionized water liquid into the machining gap to form a mixture with the injected gases therein and subjecting the same mixture to the electrical discharges. Sometimes it has been found to be desirable to limit the entry of the deionized water liquid into the machining gap to a minimum. The entry may be limited to a minimum by providing a porous partition adjacent to said region of the machining gap.

In practicing the method according to the invention, the said gases may be injected into the machining gap by directing a stream of the gases towards the machining gap and incorporating a said deionized water liquid into that stream prior to injection into the machining gases. Alternatively, a stream of a said deionized water liquid may be directed towards the machining gap and, into that stream, there may be incorporated the volume of the said gases prior to injection into the machining gap. Each stream may be directed towards the machining gap through an internal bore of the tool electrode. The mixing of the gases and the deionized water may be carried out in the internal bore of the tool electrode.

It has been found to be important to decompose the liquid hydrocarbon thermally by heating the liquid hydrocarbon at a temperature not greater than 300° C. in a heating unit.

The deionized water should have an electrical resistivity not less than $10^3$ ohm-cm.

In the practice of the method according to the invention, the volume of the yielded gases may be injected into the machining gap by directing a first stream, which is constituted at least partly by the said gases, into the gap and in step (b) the said region of the machining gap may be immersed in the volume of the water liquid by directing a second stream, which is constituted by the water liquid, towards the said region so that the second stream forms an envelop flow substantially enclosing the first stream and is forced thereby so as substantially not to enter the machining gap and then to spread over the said region surrounding the machining gap.

The tool electrode may be constituted by a continuous electrode wire. The wire is continuously transported axially to traverse the workpiece. The said second stream may be projected from a first nozzle with an opening thereof adjacent to the workpiece and coaxial with the electrode wire traversing the workpiece, and the said first stream may be projected from a second nozzle with an opening coaxial with but smaller in cross-section than the opening of the said first nozzle. The said gases may, prior to passage through the said first nozzle opening, be admixed with a said deionized water to form the said first stream.

The invention also provides, in a second aspect thereof, an apparatus for machining an electrically conductive workpiece by means of a succession of discrete, time-spaced electrical discharges effected between a tool electrode and the workpiece across a machining gap so as to electroerosively remove material from the workpiece, which apparatus comprises: means for immersing at least a region of the tool electrode and the workpiece, which defines the machining gap, in a continuous volume of a deionized water liquid of a temperature sufficient to cool at least the said region against heat to be developed by the electrical discharges; means for decomposing, outside of the machining gap, a liquid hydrocarbon to yield gases containing gaseous hydrocarbons; and means for injecting a volume of the said yielded gases into the machining gap immersed in the water liquid whereby at least a portion of the said injected volume of the gases constitutes a gap fluid medium for the electrical discharges to produce the erosive material removal while the said region tends to be cooled by said deionized water liquid.

Specifically, the decomposing means comprises heater means, feed means for passing a flow of the liquid hydrocarbon through the heater means to thermally decompose at least a portion of the flowing liquid hydrocarbon whereby to yield the said gases and means connected to the heater means for collecting the yielded gases, the said injection means including conduit means for communicating the collecting means with the machining gap to transport the collected gases into the machining gap.

Preferably, the said decomposing means includes means for maintaining the heat produced by said heater means and acting on the flowing liquid hydrocarbon, at a temperature not greater than 300° C.

The apparatus may comprise a mixing chamber for receiving the said gases through a first inlet thereof and a said deionized water liquid through a second inlet thereof to produce a stream of fluid containing the received gases and water liquid and means for directing the stream into the machining gap.

The apparatus may comprise a source of said liquid hydrocarbon and feed means for feeding the liquid hydrocarbon from the said source towards the machining gap along conduit means, the said decomposing means being disposed at a preselected location in the said conduit means and having heater means for thermally decomposing at least a portion of the liquid hydrocarbon traveling from the source to cause the decomposition yielded gases to be fed and injected into the machining gap.

The tool electrode may have an internal bore open to the machining gap and constituting a portion of the said conduit means. The heater means may be located within the said internal bore.

The injecting means may include at least one nozzle means for directing a stream constituted at least partly by the said gases into the machining gap and the immersing means may include second nozzle means for directing a second stream constituted by the water liquid towards the said region so that the said second stream forms an envelop flow substantially enclosing the said first stream and is forced thereby so as substantially not to enter the machining gap and then to spread over the said region surrounding the machining gap.

The tool electrode may be a continuous wire electrode and the apparatus may include means for continuously transporting the electrode wire axially to traverse the workpiece, the said first nozzle means having a first nozzle opening, for projecting to said second stream, the said first nozzle opening being adjacent to the workpiece and coaxial with the electrode wire traversing said workpiece, said second nozzle means having a second nozzle opening for projecting the said first stream, the said second nozzle opening being coaxial but smaller in cross-section than the first nozzle opening of the said first nozzle means.

The said heater means may be disposed within the said first nozzle means.

Optionally, the lateral surface of the tool electrode is enclosed with a partition member for limiting entry of the water liquid into the machining gap. The partition member may be constituted by a porous body composed of a rubber or synthetic resin, or a metal or alloy coated with a synthetic resin or rubber. Advantageously, the partition member is composed at least in part of a permanent magnet so as to be capable of attachment to the ferrous workpiece by magnetic attraction.

BRIEF DESCRIPTION OF THE DRAWING

These and other features of the present invention as well as advantages thereof will become more readily apparent from a reading of the following description of certain embodiments thereof when taken with reference to the accompanying diagrammatic drawing in which.

SPECIFIC DESCRIPTION

Figure 1:
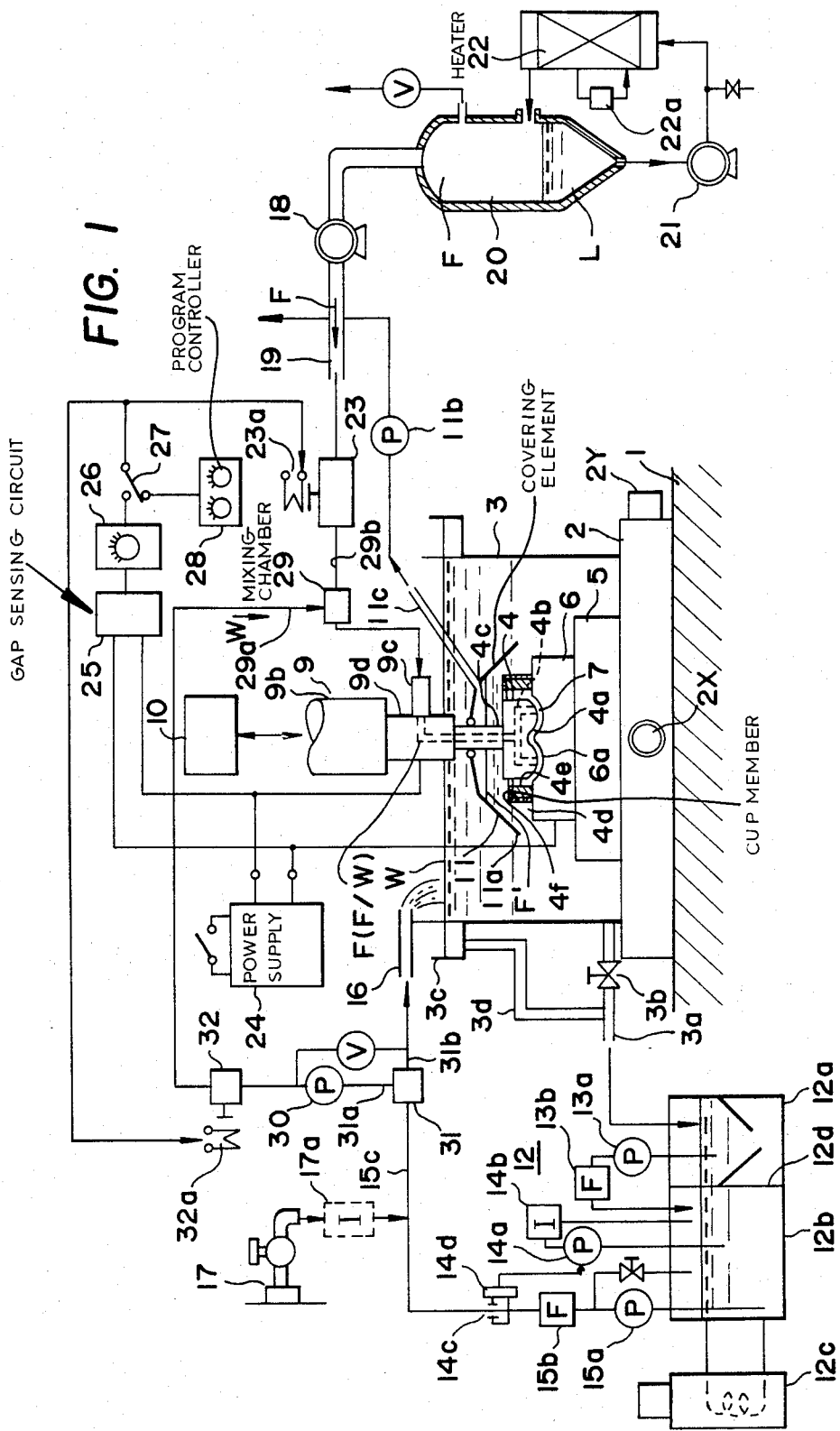
FIG. 1 is a view partly in section and partly in schematic form illustrating an embodiment of the present invention as applied to a sinking-type EDM process.

FIG. 1 shows an apparatus embodying the principles of the present invention as applied to a boring or sinking-type EDM machine which includes a bed 1 and a cross-table 2 mounted to be slidably movable thereon. The cross-table 2 has a worktank 3 securely mounted thereon and is displaceable in an X-Y or horizontal plane by means of an X-axis drive motor 2x and a Y-axis drive motor 2y. Typically, these motors are controlledly driven by a sequence-controller or numerical-control (NC) unit (not shown) for establishing an EDM position, or two- or three-dimensional contouring EDM purposes. Where three-dimensional cavity-sinking is to be performed as with a formed tool electrode 4 as illustrated, such a control unit needs to be prepared as to assume only a point-to-point positioning function to establish the position of a workpiece in the X-Y plane relative to the axis of the tool electrode 4.

Disposed and fixed in position in the worktank 3 is a worktable 5 which carries a workpiece 6 thereon. The workpiece 6 is positioned in spaced juxtaposition with the tool electrode 4 to define a small machining gap 7 which is shown between a formed machining surface 4a of the tool electrode 4 and a surface 6a of the workpiece 6 being electroerosively machined therewith. The tool electrode 4 is formed with fluid passages 4b therein which are open to the machining gap 7 at their respective one ends and which have a common inlet at their other ends. The fluid passages 4b are open out of the tool electrode 4 to the machining gap 7 primarily at relatively projecting or convex portions on the machining surface 4a or at locations around them. It is desirable that these openings of the fluid passages be distributed uniformly over the entire machining surface 4a of the tool electrode 4.

The worktank 3 is filled with a deionized water machining liquid W to immerse therein the tool electrode 4, the workpiece 6 and the machining gap 7 defined therebetween. The water machining liquid 8 has an electrical resistivity in the range, preferably, between $10^3$ and $10^5$ ohm-cm. It is essential that the machining gap 7 be located sufficiently deep below the surface of the water machining liquid W in the worktank 3 and the water machining liquid W in the latter be held in contact with the workpiece 6 to keep it sufficiently cool during the electrical discharge machining operation.

The tool electrode 4 is securely supported by a shank 4c which is in turn detachably supported by a tool head 9. The tool head 9 has a holder 9a supporting the shank 4c and a ram 9b which carries the holder 9a. The tool holder 9a and the shank 4c are bored for supply with a flow of hydrocarbon liquid decomposition formed gases F through an inlet 9c fitted to the holder 9a to deliver this flow through the passages 4b into the machining gap 7. The ram 9b is shown as extending coaxially with the tool holder 9a and the electrode shank 4c and is vertically movable by a servo-control unit 10 to displace the tool electrode 4 up and down along a Z-axis which is orthogonal to the X-Y plane.

Optionally, the lateral surface of the tool electrode 4 may be enclosed with a generally annular partition member 4d for limiting entry of the water liquid W into the machining gap 7, the member comprising a cylindrical porous body 4e composed of a rubber or synthetic resin or a porous metal or alloy coated with a resin and rubber. The body 4e is shown standing on the workpiece 6 and enclosed with a cup member 4f having a top opening through which the tool electrode 4 is slidably passed. The cup member 4f is formed with apertures 4g. The gases F injected into the machining gap 7 are subjected to electrical discharges, resulting in a gaseous effluent F', which, entrapping the discharge products, are led away from the machining gap 7 and allowed to pass through the porous body 4e and then through the apertures 4g for diffusion into the water liquid 8. The cup member 4f is, preferably, composed of a permanent magnetic material so as to be capable of magnetic attachment to the ferrous workpiece 6.

Disposed to overlie the tool electrode 4 and the workpiece 6 is a covering 11 in the form of a downwardly open box or umbrella to capture the gaseous effluent F' evolving through the water liquid W from the machining gap 7. The covering 11 is supported fittedly through its central opening with the shank 4c and should be of a size sufficient to extend over the machining gap 7 and to thoroughly catch the evolving gaseous effluent F'. The covering 11 may be positioned to immerse its entirety in the water liquid 8 retained in the worktank 3. At the commencement of an EDM operation, at least the periphery 11a of the covering 11 at its lower end needs to be immersed in the water liquid W. The covering 11 is provided at a portion of its top with a drain conduit 11b for drawing the gaseous effluent F' evolving from the machining gap 7 and collected beneath the covering 11. The gaseous effluent F' recovered from the machining gap 7 is thus effectively prevented from overaccumulation in the covering 11 and flowing out thereof into the remainder of the worktank 3. The gaseous effluent F' is drawn under suction by a pump 11b and led via the conduit 11c to an appropriate site for disposal.

The worktank 3 is provided with a drain pipe 3a which is connected to a water liquid treatment system 12. A valve 3b is provided in the pipe 3a and is opened to drain the water liquid W in the worktank 3 into the treatment system. The worktank 3 has its top rim 3c projected outwards for accepting the overflowing water liquid which contains the machining contaminants and permitting it to flow by gravity through a pipe 3d into the drain pipe 3a.

The water liquid treatment system 12 includes a sedimentation tank 12a for receiving the used water liquid 8 from the drain pipe 3a to allow sludges in the received liquid to be sedimented generally by gravity therein. A clearer upper layer of the water liquid in the sedimentation tank 12a is drawn by a pump 13a and passed through a filter 13b for reception in a purified water tank 12b. The latter is equipped with a temperature control (cooling and/or heating) unit 12c for maintaining the purified water liquid in the tank 12b at a predetermined temperature. The water liquid in the tank 12b is recycled by a pump 14a through an ion-exchanger cartridge 14b to control its electrical conductivity or resistivity. The conductivity-adjusted water liquid is drawn from the tank 12b by a pump 15a and is thereby fed through an ultra-fine filter 15b into the worktank 3 via an inlet conduit 16 disposed at a top portion of the worktank 3. A conductivity (resistivity) detecting sensor 14c is provided between the filter 15b and the inlet conduit 16 and is connected to a control circuit 14d which is designed to control the operation of the pump 14a, thereby maintaining the electrical conductivity or resistivity at a predetermined value in excess of $10^3$ ohm-cm. When a deviation of the conductivity or resistivity from such a preset value is detected by the sensor 14c, the control circuit 14d is operated to actuate the pump 14a (which has been deactuated) to circulate the water liquid in the tank 12b through the ion-exchanger cartridge 14b until the preset conductivity or resistivity of the water liquid W is restored.

To the purified water flowing through the water delivery conduit 15c between the ultra-fine filter 15b and the inlet 16 to the tank 3 there may be added a municipal water liquid supplied by a tap 17. Optionally, a further ion-exchange cartridge 17a may be provided between the tap 17 and the water delivery conduit 15c.

In this manner, the worktank 3 is replenished with the refreshed water liquid having a desired conductivity and resistivity, which should be in excess of $10^3$ ohm-cm. Alternatively, the municipal water liquid from the tap 17 may, with or without deionization by the further ion-exchange cartridge 17a, be added to the tank 12b or 12a. The tanks 12a and 12b may as shown be two reservoirs separated by a partition 12d in a single tank unit which is cooled and/or heated by the temperature control unit 12c to maintain the liquids in both reservoirs at an equal predetermined temperature.

The gaseous machining fluid F for supply into the EDM gap 7 is fed by a pump 18 into the fluid inlet 9c to the tool electrode 9 via a fluid conduit 19 from a fluid-tight vessel 20. The vessel 20 contains a liquid hydrocarbon L such as kerosene stored therein which is circulated by a pump 21 through a heater tube 22. The liquid hydrocarbon L passing through the heater tube 22 is thermally decomposed therein into gases F which are led into the vessel 20 where they are collected above the liquid hydrocarbon L. The heater 22 is energized to heat a passageway therein for the liquid hydrocarbon L at an elevated temperature of 300° C. or less whereby to yield a mixture of the gaseous components F containing by volume 30 and 85% hydrogen and the balance essentially gaseous hydrocarbons $C_xH_y$ (under the atmospheric pressure). Preferably, the heater 22 is provided with a control unit 22a for maintaining the passageway in the heater 22 at a predetermined temperature not in excess of 300° C. In the conduit 19 there is provided an electromagnetically operated valve 23 whose opening is controlled by an input signal applied to an energization winding 23a to supply the unique gaseous machining fluid F under pressure into the machining gap 7 at a controlled rate of volume flow.

An EDM power supply 24 has one output terminal electrically connected to the tool electrode 4 via the conductive tool holder 9a and the conductive electrode shank 4c and the other output terminal electrically connected to the workpiece 6. The power supply 24 may be of any conventional design to supply a train of electrical voltage pulses across the machining gap 7 between the tool electrode 4 and the workpiece 6. These voltage pulses result in a succession of electrical discharges through the gap 7, thereby electroerosively removing material from the workpiece 6.

Connected also to the machining gap 7 is a gap sensing circuit 25 designed to detect one or more electrical gap variables, e.g. gap voltage and/or current, on a per-pulse basis or on an average basis over a number of machining pulses to monitor the gap state in the EDM operation. For example, an average gap or discharge voltage and/or current, or a peak discharge current or voltage, or an average discharge current or voltage during each individual pulse, or a high-frequency current or voltage component during each discharge pulse may be detected by the gap sensing circuit 25 and may be compared with one or more reference values preset therein. The output signal of the gap sensing circuit 25 is applied to a control circuit 26 connected via a switch 27 to the energization circuit 20a of the electromagnetic valve 20 to selectively open and close the valve 20 or to control the opening of the valve 20. The switch 27 is closed by a program controller 28.

With the valve 20 opened, it will be apparent that the liquid hydrocarbon decomposition formed gaseous fluid F is forced via the inlet 9c into the machining gap 7 to flood essentially or almost the entire area thereof defined between the tool electrode 4 and the workpiece 6 and there serves a unique EDM machining medium through which a succession of machining electrical discharges are to occur. The machining medium may contain a liquid water component diffused from the body of the water liquid W in the worktank 3 that the said gaseous components F may be present in admixture with the said water component. From the EDM gap 7 there emerges the degenerated gaseous machining effluent F' which is evolved through the water liquid W and is eventually caught with the covering 11 and drawn through the outlet 11b under suction.

On the other hand, the tool electrode 4 and the workpiece 6 along almost all their surface areas except defining the machining gap 7 are held in contact with the water liquid 8 which is higher in thermal conductivity and greater in heat capacity, hence higher in cooling ability than a hydrocarbon liquid such as kerosene. The ability of the water liquid 8 to cool the tool electrode 4 and the workpiece 6 with greater effectiveness allows the on-time or pulse interval between successive voltage pulses to be much reduced and the frequency of these pulses or discharge repetition rate to be markedly increased, thereby increasing the removal rate or shortening the machining time. Furthermore, according to the method described, there is achieved a marked improvement in the relative electrode wear, i.e. the ratio in weight or volume of the wear of the tool electrode 4 to the amount of stock removed from the workpiece 6, as compared with the conventional method (which has heretofore been believed to yield the best result) in which the worktank (3) is filled with a hydrocarbon liquid such as kerosene whose temperature is maintained at 25° C. or so. It has been recognized that such a marked improvement in the relative electrode wear according to this method is attributed to the fact that carbon is effectively furnished from the gaseous fluid which contains gaseous hydrocarbons and effectively deposited on the electrode surfaces in compensation for the discharge wear.

It has been found that a volume of 1000 cc of gaseous component F as a yield of the decomposition of kerosene are generally required in removing a ferrous material of 1 gram by electrical discharges. To achieve a removal rate of 1 gram per minute, it thus appears that the gaseous fluid F may be replenished to and passed through the machining gap 7 at a volume flow rate of 1000 cc/minute. On the other hand, the volume of 1000 cc of the gaseous fluid F can be produced from 1 cc of kerosene liquid. It is thus seen to be desirable to decompose kerosene liquid at a rate of 1 cc/min in the decomposition system 20–22.

It has been found that the gaseous components F resulting from decomposition of a liquid hydrocarbon in the system 20–22 can be supplied, in mixture with liquid water W, into the machining gap 7 to constitute a novel EDM machining fluid therein. To this end, the apparatus of FIG. 1 further includes a mixing chamber 29 in the conduit 19 having a first inlet 29a fed with water liquid L of a controlled electrical resistivity as described and a second inlet 29b fed with the gaseous components F from the vessel 20. The liquid water W may be supplied by a pump 30 into the mixing chamber 29 from the conduit 15c. To this end the conduit 15c is provided with a bifurcation 31 having a first outlet 31a leading via a valve 32 to the first inlet 29a of the mixing chamber 29 and a second outlet 31b leading to the inlet 16 to the worktank 3. The valve 32 is provided to regulate the volume flow of the liquid water W into the mixing chamber 29.

Thus, in the mixing chamber 29 the gaseous components F are admixed with the liquid water W or entrained in a stream thereof for delivery into the machining gap 7 through the tool electrode 9.

The gas/water (F/W) mixture flushed into the machining gap 7 is there subjected to machining electrical discharges and acts as a unique EDM medium exhibiting enhanced machining efficiency.

The gaseous components F resulting from decomposition of a liquid hydrocarbon 1 in the system 20–22 may be supplied, in admixture with liquid water W, into the machining gap 7 to constitute a novel EDM machining fluid therein. To this end, the apparatus of FIG. L further includes in the conduit 19 a mixing chamber 29 having a first inlet 29a fed with liquid water W of a controlled electrical resistivity as described and a second inlet 29b fed with the gaseous components F from the vessel 20. The liquid water W may be supplied by a pump 30 into the mixing chamber 29 from the conduit 15c. The conduit 15c is thus provided with a bifurcation 31 having a first outlet 31a leading via a valve 32 to the first inlet 29a of the mixing chamber 29 and a second outlet 31b leading to the inlet 16 to the worktank 3. The valve 32 is provided to regulate the volume flow of the liquid water W into the mixing chamber 29. The mixing chamber 29 may alternatively be arranged interior of the tool electrode 4.

Thus, the gaseous components F and the liquid water W are homogeneously admixed to form a stream of the mixture (F/W) for delivery into the machining gap 7 through the tool electrode 9. The gas/water (F/W) mixture flushed into the machining gap 7 provides a highly favorable EDM medium. It has been found that unique machining characteristics are thereby obtained. The gaseous components in the mixture facilitate initiation of each individual machining electrical discharge. The coolant water component serves to sharply pinch each discharge column established and acts to quickly deionize the machining gap and extinguish the discharge promptly upon removal of the voltage pulse. The water coolant serves to hold the workpiece 6 against excessive heating and to cool the discharge spots promptly. The gaseous hydrocarbons contained in the gaseous components F upon decomposition by each discrete electrical discharge furnish carbon which is deposited on the electrode surface which is stock-removed by the electrical discharge to form a layer of the deposite, thus substantially maintaining the original volume of the tool electrode. In this manner, machining is allowed to continue with an improved precision in an improved low or no wear mode. Furthermore, the enhanced cooling action serves to stabilize repetitive machining electrical discharges and thus to achieve machining with an increased removal rate. The gaseous components entrained in the form of bubbles in the water stream undergo dynamic expansion and shrinkage against pressure unbalances in the narrow gap 7 so that machining discharges seldom concentrate on a localized area therein and the discharge removed particles are carried away therefrom more smoothly than with the conventional machining fluid.

Both valves 20 and 32 together may be controlledly operated by the controller 28 when the machining fluid supplied through the tool electrode 4 is constituted by the gas/water mixture F/W. When the machining fluid delivered into the machining gap 7 via the tool electrode 4 is constituted by the gaseous components F alone, the valve 32 is, of course, kept closed and only the valve 20 is controlledly operated by the controller 28.

Figure 2:
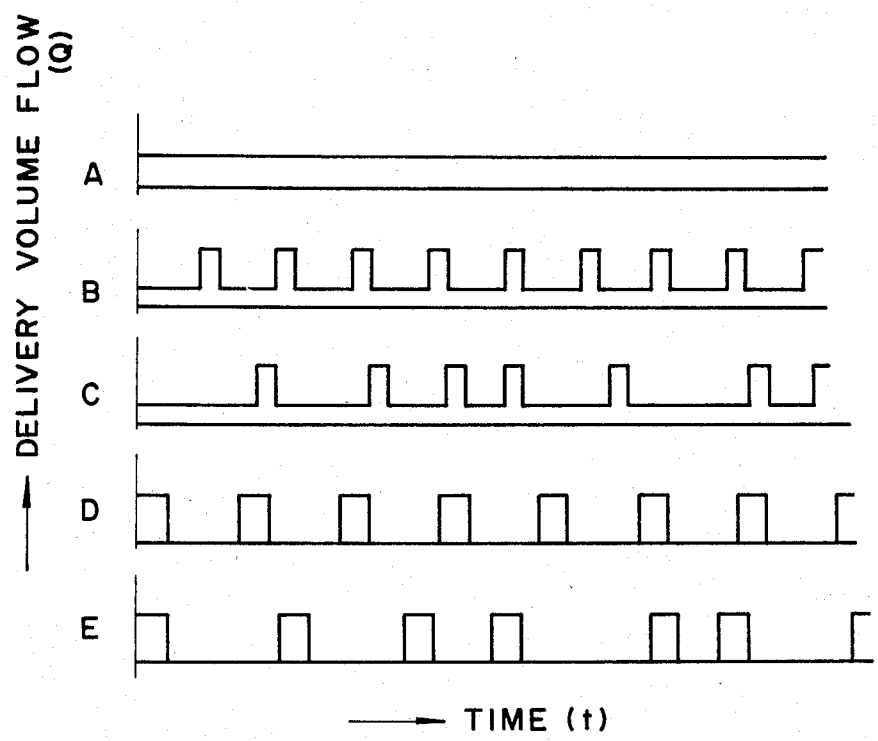
FIGS. 2(A)–2(E) are time charts illustrating various modes of delivering the machining fluid composed of or containing the liquid hydrocarbon decomposition yielded gases into the machining gap in accordance with the present invention.

The electromagnetic valve 20 or valves 20 and 32 may be operated in any of various modes as shown in time charts (A)—(E) in FIG. 2 to control the rate of flow of the gaseous machining fluid F delivered alone or in admixture with the liquid water W into the machining gap 7 through the inlet conduit 9c. It can be seen that the chart (A) shows a constant delivery (Q) of the machining fluid F or F/W with respect to time. The chart (D) shows that the valve 20 is or valves 20 and 32 together are opened periodically with a predetermined open-time and a predetermined close-time to periodically flush the machining gap 7 with a predetermined amount of the machining fluid F or F/W. In this case, the controller 28 is designed to provide a succession of signal pulses and connected via the switch 26 to the energizing circuit 20a or both the circuits 20a and 32a for the electromagnetic valve 20 or valves 20 and 32 to periodically open it or them. The control circuit 26 remains disconnected from the energization circuit 20a or circuit 20a and 32a. The chart (B) shows that the valve 20 is held open to secure a minimum constant flow of the machining fluid F or F/W delivered into the machining gap 7 and the opening of the valve 20 is or valves 20 and 32 together are periodically enlarged to periodically increase the delivery flow. The controller 28 continuously connected to the energization circuit 20a via the switch 27 provides a constant energization signal on which a succession of signal pulses is superimposed. The time chart (E) shows that the control circuit 26 operating in response to the EDM gap sensor 25 is connected to the energization circuit 20a for the electromagnetic valve 20 while the controller 28 remains disconnected therefrom. It is shown that the valve 20 or valves 20 and 32 together are opened aperiodically with a predetermined open-time and the close-time which varies as a function of the gap state. The chart C shows that the valve 20 or valves 20 and 32 together are held open in response to a continuous signal furnished by the controller 28 to secure a minimum constant flow delivery and the opening of the valve 20 is intermittently enlarged to intermittently increase the flow delivery in response to output signals of the control circuit 26 responding through the sensor 25 to the gap state. The switch 27 keeps the control circuit 27 and the controller 28 connected to the energization circuit 20a. It will be understood that various combinations of the different modes of delivery of the machining fluid F or F/W shown in FIGS. 2(A)–2(E) and described are also possible.

The principles of the present invention are also applicable to a traveling-wire type EDM arrangement in which a continuous wire electrode is axially displaced vertically traversing a workpiece disposed between a pair of wire-guide members. In embodying the invention, for example, the workpiece is immersed in a water liquid (W) retained in a worktank 3 and two nozzles disposed respectively on the upper and lower sides of the workpiece are supplied with the machining fluid F or F/W for injection into the machining gap. A covering (11) may be arranged to depend from an arm on which the upper wire guide member is mounted.

Figure 3:
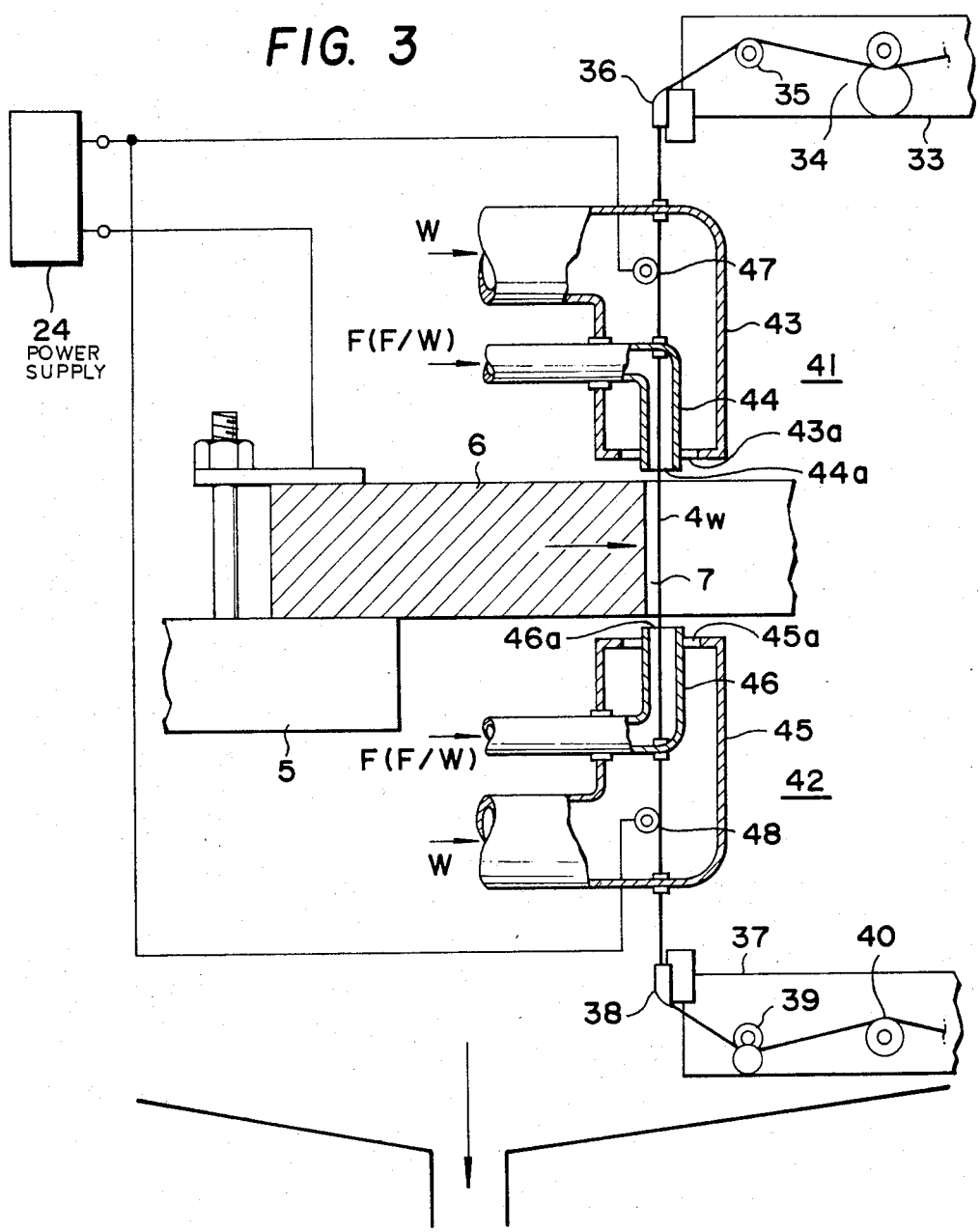
FIG. 3 is a side view partly in section illustrating an embodiment of the present invention as applied to a traveling-wire EDM process.

FIG. 3 shows another embodiment of the invention as applied to a traveling-wire type EDM machine. As is conventional, a continuous wire electrode 4w is axially transported to vertically traverse a workpiece 6 which is mounted on a worktable 5. The machine includes an upper arm 33 disposed above the workpiece 6 and having a brake unit 34, a guide roller 35 and an upper wire-positioning guide member 36 mounted thereon and a lower arm 37 disposed below the workpiece 6 and having a lower wire-positioning guide member 38, a capstan and pinch roller unit 39 and a guide roller 40 mounted thereon. Thus, the wire electrode 4w from a supply (not shown) is axially driven by the capstan and pinch roller unit 39 and under a braking force exerted by the brake roller 34 and is axially transported via the guide roller 35, the upper wire-positioning guide member 36, the workpiece 6, the lower wire-positioning guide member 38 and the guide roller 40, and is eventually taken up by a collection means (not shown).

In addition, the machine is provided, in accordance with the present invention, with two coaxial nozzle units 41 and 42 which are disposed between the upper wire-positioning guide member 36 and the workpiece 6 and between the latter and the lower wire-positioning guide member 38, respectively. The upper nozzle unit 41 open to the upper surface of the workpiece 6 and coaxial with the wire electrode 4w comprises a first nozzle 43 having a nozzle opening 43a of a greater cross-section and a second nozzle 44 having a nozzle opening 44a of a smaller cross-section coaxial with and projected from the nozzle opening 43a of the first nozzle 43. The lower nozzle unit 42 open to the lower surface of the workpiece 6 and coaxial with the wire electrode 4w comprises a first nozzle 45 having a nozzle opening 45a which may be same in cross-section as the nozzle opening 39a and a second nozzle 46 having a smaller nozzle opening 46a coaxial with and projected from the larger nozzle opening 41a. The nozzle opening 46a of the lower second nozzle 46 is coaxial with and same in cross section as the nozzle opening 44a of the upper second nozzle 44. The upper and lower nozzle 41 and 42 are fixed in position relative to the upper and lower arms 33 and 37 (namely the upper and lower wire-positioning guide members 36 and 38) so that as the workpiece 6 is displaced during the machining operation, they are held in position to maintain the coaxiality of their respective two nozzle openings 43a, 44a and 45a, 46a with the wire electrode 4w engaged in the EDM erosion of the workpiece 6 across the machining gap 7. Electrical brushes 47 and 48 are shown disposed in contact with the traveling wire electrode 4w within the upper and lower larger nozzles 43 and 45, respectively, and are electrically connected commonly to one output terminal of an EDM power supply 24 whose other output terminal is electrically connected to the workpiece 6.

In accordance with the present invention, the upper and lower larger nozzles 43 and 45 are fed with a water liquid W while the upper and lower smaller nozzles 44 and 46 are fed with a flow of liquid hydrocarbon decomposition formed gaseous components F or a mixture of such components and liquid water F/W as previously produced. As a result, the machining fluid F or F/W is fed coaxially with the traveling wire electrode 4w and delivered into the machining gap 7 from the upper and lower smaller nozzles 44 and 46 closer to the workpiece 6. The water liquid W is fed coaxially with the stream of the fluid F or F/W while serving as an envelop flow therefor from the upper and lower larger nozzles 43 and 45 and tends to flow over the upper and lower surfaces of the workpiece 6 and behind the advancing wire electrode 4w and the machining gap 7 therein. Electrical discharges are thus created at least predominantly through the fluid F or F/W in the machining gap 7 while a portion of the workpiece 6 surrounding the machining gap is immersed in and flooded with the water liquid W and thereby kept sufficiently cool.

What is claimed is:

1. A method of machining an electrically conductive workpiece by means of a succession of discrete, time-spaced electrical discharges effected between a tool electrode and the workpiece across a machining gap so as to electroerosively remove material from the workpiece, the method comprising the steps of:
    (a) preparing a deionized water liquid of a temperature sufficient to cool at least a region of a tool electrode juxtaposed with a conductive workpiece across a machining gap, against heat to be developed by time-spaced electrical discharges effected between said tool electrode and said workpiece across said machining gap to remove electroerosively material from the workpiece;
    (b) immersing said region across said machining gap in a continuous volume of said water liquid;
    (c) outside of said machining gap, decomposing a liquid hydrocarbon to yield gases containing gaseous hydrocarbons; and
    (d) injecting a volume of said yielded gases into said machining gap immersed in said water liquid, whereby at least a portion of said gases injected volume constitutes a gap fluid medium for said electrical discharges to remove electroerosively said material while said region tends to be cooled by said deionized water liquid.

2. The method defined in claim 1, further comprising the step of reducing an erosive wear of said tool electrode in step (d) by decomposing at least a portion of said gaseous hydrocarbons by said electrical discharges to pyrolytically form a carbonaceous layer on said tool electrode against said erosive wear.

3. The method defined in claim 1 wherein said injected gases contain a hydrogen gas.

4. The method defined in claim 3 wherein said injected volume of the gases consists by volume of 30 to 85% hydrogen and the balance essentially of said gaseous hydrocarbons.

5. The method defined in claim 4 wherein said gases contain 0.1 to 5% by volume oxygen.

6. The method defined in claim 5 wherein said gases contain 1 to 5% by volume carbon.

7. The method defined in claim 4 wherein hydrogen is contained in an amount of up to 60% by volume.

8. The method defined in claim 1 or claim 2 wherein said liquid hydrocarbon is a kerosene.

9. The method defined in claim 1, further comprising: in step (d) introducing a portion of said volume of the deionized water liquid into said machining gap to form a mixture with said injected gases therein and subjecting said mixture to said electrical discharges.

10. The method defined in claim 9, further comprising: in step (d) limiting the entry of said deionized water liquid into said machining gap to a minimum.

11. The method defined in claim 10 wherein said entry is limited to minimum by providing a porous partition adjacent to said region of the machining gap.

12. The method defined in claim 1 wherein said gases are injected into said machining gap by directing a stream of said gases towards said machining gap and incorporating said deionized water liquid into said stream prior to injection into said machining gap.

13. The method defined in claim 1, further comprising directing a stream of said deionized water liquid towards said machining gap and incorporating into said stream the volume of said gases prior to injection into said machining gap.

14. The method defined in claim 12 or 13 wherein said stream is directed towards said machining gap through an internal bore of said tool electrode.

15. The method defined in claim 14 wherein said step of incorporating is performed in said internal bore.

16. The method defined in claim 1 wherein in step (c) the liquid hydrocarbon is decomposed thermally by heating said liquid hydrocarbon at a temperature not greater than 300° C. in a heating unit.

17. The method defined in claim 1 wherein said deionized water has an electrical resistivity not less than $10^3$ ohm-cm.

18. The method defined in claim 1 wherein in step (d) said volume of the yielded gases is injected into said machining gap by directing a first stream, which is constituted at least partly by said gases, into said gap and in step (b) said region of the machining gap is immersed in the volume of said water liquid by directing a second stream, which is constituted by said water liquid, towards said region so that said second stream forms an envelop flow substantially enclosing said first stream and is forced thereby so as substantially not to enter said machining gap and then to spread over said region surrounding said machining gap.

19. The method defined in claim 18 wherein said tool electrode is constituted by a continuous electrode wire, further comprising the steps of: continuously transporting said electrode wire axially to traverse said workpiece, projecting said second stream from a first nozzle with an opening thereof adjacent to said workpiece and coaxial with said electrode wire traversing said workpiece, and projecting said first stream from a second nozzle with an opening coaxial with but smaller in cross-section than said opening of the first nozzle.

20. The method defined in claim 19, further comprising the steps of admixing said gases, prior to passage through said first nozzle opening, with said deionized water to form said first stream.

21. An apparatus for machining an electrically conductive workpiece by means of a succession of discrete, time-spaced electrical discharges effected between a tool electrode and the workpiece across a machining gap so as to electroerosively remove material from the workpiece, the apparatus comprising:

means for immersing at least a region of a tool electrode juxtaposed with a conductive workpiece across a machining gap across which a succession of discrete, time-spaced electrical discharges are effected, which region defines said machining gap in a continuous volume of a deionized water liquid of a temperature sufficient to cool at least said region against heat to be developed by said electrical discharge, said electrical discharges effecting electroerosive material removal from said workpiece;

means for decomposing, outside of said machining gap, a liquid hydrocarbon to yield gases containous gaseous hydrocarbons; and means for injecting a volume of said yielded gases into said machining gap immersed in said water liquid whereby at least a portion of said gases injected volume constitutes a gap fluid medium for said electrical discharges to produce said erosive material removal while said region tends to be cooled by said deionized water liquid.

22. The apparatus defined in claim 21 wherein said decomposing means comprises heater means, feed means for passing a flow of said liquid hydrocarbon through said heater means to thermally decompose at least a portion of the flowing liquid hydrocarbon whereby to yield said gases and means connected to said heater means for collecting the yielded gases, said injection means including conduit means for communicating said collecting means with said machining gap to transport the collected gases into said machining gap.

23. The apparatus defined in claim 22 wherein said decomposing means includes means for maintaining the heat produced by said heater means and acting on said flowing liquid hydrocarbon, at a temperature not greater than 300° C.

24. The apparatus defined in claim 21 or claim 22, further comprising a mixing chamber for receiving said gases through a first inlet thereof and said deionized water liquid through a second inlet thereof to produce a stream of fluid containing said received gases and water liquid and means for directing said stream into said machining gap.

25. The apparatus defined in claim 21, further comprising a source of said liquid hydrocarbon and feed means for feeding said liquid hydrocarbon from said source towards said machining gap along conduit means, said decomposing means being disposed at a preselected location in said conduit means and having heater means for thermally decomposing at least a portion of said liquid hydrocarbon traveling from said source to cause the decomposition yielded gases to be fed and injected into said machining gap.

26. The apparatus defined in claim 25 wherein said tool electrode has an internal bore open to said machining gap and constituting a portion of said conduit means.

27. The apparatus defined in claim 26 wherein said heater means is located within said internal bore.

28. The apparatus defined in claim 25 wherein said injecting means includes at least one nozzle means for directing a stream constituted at least partly by said gases into said machining gap and a second nozzle is provided for directing a second stream constituted by said water liquid towards said machining region so that said second stream forms an envelop flow substantially enclosing said first stream and is forced thereby so as substantially not to enter said machining gap and then to spread over said region surrounding said machining gap.

29. The apparatus defined in claim 28 wherein said tool electrode is a continuous wire electrode, further comprising means for continuously transporting said electrode wire axially to traverse said workpiece, said first nozzle means having a first nozzle opening, for projecting said second stream, said first nozzle opening being adjacent to said workpiece and coaxial with said electrode wire traversing said workpiece, said second nozzle means having a second nozzle opening for projecting said first stream, said second nozzle opening being coaxial but smaller in cross-section than said first nozzle opening of the first nozzle means.

30. The apparatus defined in claim 29 wherein said heater means is disposed within said first nozzle means.

* * * * *